Patented Feb. 16, 1954

2,669,507

UNITED STATES PATENT OFFICE 2,669,507

STABILIZED ORGANIC COMPOSITIONS CONTAINING ALKOXY PHENOLS AND MERCAPTO ALKANOIC ACIDS

David W. Young, Roselle, N. J., assignor to Standard Oil Development Company, a corporation of Delaware No Drawing. Application May 4, 1950, Serial No. 160,093

9 Claims. (Cl. 44—70)

1

This invention relates to the stabilization of organic compounds which tend to deteriorate in storage or in use due to undesirable oxidation reactions. In accordance with this invention, these organic compounds, and especially hydrocarbon type compounds, are stabilized against oxidation by incorporating therein small amounts of low molecular weight mercapto alkanoic acids, admixed in synergistic association with alkoxy phenols.

Various organic compounds and mixtures, including motor fuels, mineral oils, rubbers, resins, insecticides, soaps, olefins, lubricating oils, etc., are adversely affected by oxygen, with the resultant formation of undesirable gums and usually discoloration of the organic compounds as well as other deleterious reactions.

Thus, for example, in the oil refining industry, in order to prepare fuel of superior quality, it is generally necessary to stabilize the fuel against degradation which would normally occur due to oxidation of the fuel components. In general, hydrocarbon mixtures falling in the gasoline or lubricating oil boiling range, if unstabilized, will over a period of time under certain conditions be subject to gum formation, sludge formation, the formation of acids and the formation of objectionable color bodies.

It is also known that synthetic rubbers undergo changes due to further polymerization or degradation due to depolymerization on exposure to air and consequently yield on vulcanization inferior products unless there is incorporated therewith at time of synthesis a compound which stabilizes the synthetic rubber by largely preventing oxidation, degradation and/or cyclization of the chain molecules present in the polymer structure. Natural, as well as synthetic, rubbers require an anti-oxidant present in the vulcanizate in order that finished rubber products are stable toward oxidation and heat during their useful life.

It has now been found that mixtures of low molecular weight mercapto alkanoic acids, i. e., those having up to 10 carbon atoms, with alkoxy phenols, wherein the alkoxy group is in a para position to the hydroxyl group, are extremely effective oxidation inhibitors and stabilizers for materials which usually degrade in the presence of air and/or heat.

It is especially surprising to find that the indicated mixture of ingredients are effective as a combination anti-oxidant mixture in view of the fact that the low molecular weight mercapto alkanoic acids, are themselves possessed of little or no anti-oxidant activity. The mixture of the two ingredients cooperate, however, in a synergistic manner to give an anti-oxidant effect which is not only greater than the cumulative effect of each ingredient, but is also greater than the effect achieved through the use of the para alkoxy phenol anti-oxidant alone in an amount equal to the amount of the mixture of the combined ingredients.

As stated above, the low molecular weight mercapto alkanoic acids employed are those having up to 10 carbon atoms. Especially effective are those compounds in which the mercapto group is on the terminal carbon atom with reference to the carboxyl group. Particularly effective activating compounds utilized in this invention are 2-mercapto ethanoic acid, and 3-mercapto propionic acid.

The alkoxy phenols employed are those in which the alkoxy group is in a para position as regards the hydroxyl group. These alkoxy phenols include those known in the art as well as the bis alkoxy phenols disclosed in my copending application, U. S. Serial No. 128,678, filed November 21, 1949, now U. S. Patent No. 2,591,651 granted April 1, 1952. The alkoxy phenols employed wherein the alkoxy group contains up to 4 carbon atoms are particularly useful. The alkoxy phenols can also be further alkyl substituted. Among the particular compounds that may be employed are 2 - t - butyl - 4 - methoxyphenol; 2-2-bis (2-hydroxy-5-methoxy-phenyl)-propane; 2,2-bis (2-hydroxy-3-t-butyl - 5 - methoxyphenyl) propane; styrene alkylated 4-methoxyphenol; 2 - bromo - 4 - methoxy phenol, 2 - t-butyl,4-methoxy,6 bromo phenol.

The synergistic combination of the two above described ingredients is quite specific in nature. Thus, other related compounds, some containing sulfur were substituted for the mercapto alkanoic acids in various hydrocarbons and were found not to activate the alkoxy phenols. The compounds listed below thus did not activate the alkoxy phenols:

Hydrogen sulfide—acetone condensation product
Citric acid
Phosphoric acid
Glacial acetic acid
Chloroacetic acid
Methyl mercaptopropionaldehyde $$(CH_3SCH_2CH_2CHO)$$

beta Bromopropionic acid
beta Ethoxypropionic acid
Thio dipropionic acid
Dithiodiglycolic acid Conversely, as appears in fuller detail below in the examples, when ordinary well-known phenolic anti-oxidants which did not contain the alkoxy group were substituted for the alkoxy phenols in the combined combinations with the mercapto alkanoic acids there was no activation by the latter.

The method of preparation of the ingredients of this invention are known, are not the subject of this invention and need not be given here.

The following examples are given to illustrate this invention and supply the test results on the combined ingredients utilized as anti-oxidants.

EXAMPLE 1

In this example, the evaluation test used was the ASTM Oxidation Stability Test designated as ASTM-D-525-46. This test essentially consists of placing 50 cc. of the composition being tested in a bomb, after which oxygen is added to provide a pressure of about 100 lbs., p. s. i. g. This bomb is then heated to about 100° C. and the pressure in the bomb is determined at 15 minute intervals. When sufficient time has passed so that the pressure drops two lbs. p. s. i. g. in 15 minutes, the test is discontinued and the time required to reach this condition is recorded as the induction period or the ASTM break-down time and is ordinarily given in minutes. A material subjected to this test which is markedly unstable to oxidation will result in an ASTM break-down time of about one hour, while an oxidation stable mixture will be characterized by break-down times of 150 minutes or longer.

The results are indicated in Table I below:

EXAMPLE 2

The same ASTM test indicated above was performed on pure di-isobutylene (isobutylene dimer); the results follow:

| | Breakdown time in minutes |
|---|---|
| 1. No anti-oxidant | 80 |
| 2. 1 lb. of 2-mercapto ethanoic acid/5,000 gal. of di-isobutylene | 70 |
| 3. 2 lbs. of 2,2-bis(2-hydroxy-3-t-butyl-5-methoxy-phenyl) propane/5,000 gal. of isobutylene | 2200 |
| 4. 1 lb. of 2-mercapto ethanoic acid, plus 0.5 lb. of 2,2-bis(2-hydroxy-3-t-butyl-5-methoxy-phenyl)propane/5,000 gal. of di-isobutylene | 3200 |

This example again illustrates that the mercapto alkanoic acids alone have no anti-oxidant activity, but when combined with an alkoxy phenol give a superior effect to that obtained by even a larger amount of alkoxy phenol by itself. This example also illustrates the utility of the combined ingredients for the prevention of oxidation of olefins.

EXAMPLE 3

The ingredients of this invention were tested for oxidation inhibiting efficiency on Andok C grease (a metal stearate thickened mineral oil). The "Norma Hoffman" oxidation test was used. This test comprises placing the grease in glass sample dishes in an oxidation bomb at 210° F. and 110 lbs. of initial oxygen pressure, using 20 gram samples of the grease. The pressure drop

*Table I—Activation of alkoxy phenolic type anti-oxidants in cracked leaded premium gasoline*

[Wt. of phenolic anti-oxidant when employed in test, 2 lbs. per 5,000 gallons of gasoline.]

| Item No. | Name of Phenolic Anti-oxidant | Name of Activator | Wt. of Activator Used in Gasoline Blend | | | |
|---|---|---|---|---|---|---|
| | | | 0 Lb./ 5,000 gal. | 2 Lbs./ 5,000 gal. | 4 Lbs./ 5,000 gal. | 8 Lbs./ 5,000 gal. |
| | | | Min. | Min. | Min. | Min. |
| 1 | (2,6-di-t-butyl-4-methylphenol) | 2-mercapto ethanoic acid | 270 | 270 | 280 | 280 |
| 2 | 2-t-butyl-4-methoxy-phenol | do | 440 | 540 | 570 | 680 |
| 3 | 2-2-Bis(2-hydroxy-5-methoxy-phenyl) propane. | do | 330 | 420 | 450 | 460 |
| 4 | 2,2-Bis(2-hydroxy-3-t-butyl-5-methoxyphenyl) propane. | do | 615 | 725 | 840 | 1,010 |
| 5 | Styrene alkylated 4-methoxy-phenol. | do | 340 | 430 | 430 | (¹) |
| 6 | N,N'-Di-sec-butyl-p-phenylenediamine. | do | 740 | 740 | 730 | 720 |
| 7 | 2,2-Bis(2-hydroxy-3-t-butyl-5-methylphenyl) propane. | do | 245 | 240 | 250 | 220 |
| 8 | 2,4,6-tri-t-butylphenol | do | 260 | 260 | 250 | 255 |
| 9 | None | do | 130 | 130 | 130 | 125 |
| 10 | 2-t-butyl-4-methoxy phenol | 3-mercapto propionic acid | 440 | 500 | 500 | 510 |
| 11 | 2,2-Bis(2-hydroxy-5-methoxy-phenyl) propane. | do | 330 | 400 | 410 | 420 |
| 12 | None | do | 130 | 90 | 120 | 100 |
| 13 | do | None | 130 | | | |

¹ Not determined.

Several points in this table should be noted particularly. Items 9 and 12 illustrate that the mercapto alkanoic acids by themselves are possessed of no anti-oxidant activity. Items 1, 6, 7 and 8 indicate that well-known phenolic anti-oxidants not possessed of the alkoxy group are not activated by the mercapto alkanoic acids. The remaining items, i. e., 2 through 5, and 10 and 11, illustrate the marked improvement in anti-oxidant efficacy obtained by the alkoxy phenol through the addition of the mercapto alkanoic acid.

is measured periodically. The results were as follows:

| | Pressure Drop in Hours | | | | | |
|---|---|---|---|---|---|---|
| | 28 hrs. | 30 hrs. | 44 hrs. | 80 hrs. | 144 hrs. | 165 hrs. |
| 1. 1 wt. percent of 2,2-Bis (2-hydroxy-5-methoxy phenyl) propane | 8 | | 17 | 39 | 50 | 60 |
| 2. 1 wt. percent of 2,2-Bis (2-hydroxy-5-methoxy phenyl) propane, plus 0.5 wt. percent of 2-mercapto ethanoic acid | | | 4 | 10 | | |
| 3. Control | 7 | 10 | 62 | | | |

This example again illustrates the superiority of the combination of the mercapto alkanoic acid with the alkoxy phenol as compared to the use of the latter alone.

EXAMPLE 4

The compositions of this invention were tested for its oxidation inhibiting efficiency on GR-I rubber (low unsaturation isobutylene-diolefin polymer, see U. S. 2,356,128), a copolymer of isobutylene and isoprene. This test was conducted as follows: A small piece of controlled raw GR-I rubber containing no inhibitor at all was placed in a dark air oven maintained at a temperature of 110° C. Two pieces of GR-I rubber which had admixed only methoxy phenols were placed in the oven. Two other pieces of the same rubber had admixed both the indicated alkoxy phenols and mercapto alkanoic acids. Staudinger molecular weights were determined before and after the aging.

*GR-I rubber accelerated aging tests at 110° C.*

| Name of Inhibitor | Name of Acid | Wt. Percent Phenol | Wt. Percent Acid | Time in Hours |||||| 
|---|---|---|---|---|---|---|---|---|---|
| | | | | 0 | 100 | 200 | 300 | 400 | 500 |
| None | None | | | 33,000 | 10,000 | 5,000 | 4,000 | 4,000 | |
| 2-t-butyl-4-methoxy phenol | ----do---- | 0.25 | | 33,000 | 20,000 | 12,000 | 7,000 | 5,000 | |
| 2,-t-butyl-4-methoxy phenol | 3-mercapto propionic acid | 0.125 | 0.125 | 33,000 | 31,000 | 30,000 | 20,000 | 12,000 | 9,000 |
| 2,6 di-t-butyl-4-methoxy phenol | None | 0.25 | | 33,000 | 22,000 | 18,000 | 15,000 | | |
| 2,6 di-t-butyl-4-methoxy phenol | 3-mercapto propionic acid | 0.125 | 0.125 | 33,000 | 32,000 | 31,800 | 16,800 | 16,000 | 12,000 |

It should be noted how the samples containing both alkoxy phenols and mercapto alkanoic acid exhibited by far the greatest molecular weight retention.

It is to be seen from the above examples that the compounds of this invention provide markedly effective oxidation inhibition. As a result of these tests, it is contemplated in accordance with this invention that the class of inhibitors indicated may be used generally to stabilize oxidation unstable mixtures. The indicated mixtures are particularly adapted for use with hydrocarbons such as gasolines, mineral oils, rubbers and wax polymer blends.

It is particularly proprosed that the anti-oxidant mixtures of this invention be employed to stabilize hydrocarbon mixtures such as gasolines, mineral oils and lubricating oils as well as turbine oils. The two synergistic components of this invention apparently are best suited for utilization in hydrocarbons because of their compatability with the latter.

The hydrocarbon synthetic rubbers which may be stabilized in accordance with this invention in addition to the GR-I rubber are the polymers of monomeric materials consisting predominantly of a polymerizable conjugated diolefin having four to six carbon atoms, e. g., 1,3-butadiene, isoprene, 2,3-dimethylbutadiene-1,3, 2-chlorobutadiene, piperylene, 2-methylpentadiene-1,3 and the like; hence synthetic rubbers of the above class include polymers of these materials and also copolymers prepared by the polymerization of monomer mixtures consisting predominantly of such a polymerizable butadiene-1,3 and also containing, if desired, other hydrocarbon monoethylenically unsaturated compounds copolymerizable with butadiene-1,3, such as styrene, alpha methyl styrene, vinyl naphthalene, acrylonitrile and the like. Natural vulcanized rubber is also stabilized by the compounds of this invention.

The incorporation of the mixtures of this invention with the synthetic rubber may be carried out simply by adding the compounds either in the solid form or in solution, suspension or emulsion to the solid synthetic rubber during the milling operation or to a latex containing the synthetic rubber dispersed in an aqueous medium such as is ordinarily obtained by an emulsion polymerization process.

The amount of the indicated ingredients added to the normally oxidizable material in order to prevent oxidation varies with different materials.

In general, the amount of each component that has to be added to the normally oxidizable material represents only a small proportion of the normally oxidizable substance, i. e., 0.0003-5 wt. percent based on the normally oxidizable material of each component, with each ingredient added in most cases in approximately equal amounts.

Typical formulations are as follows with the weight percent figure based on the normally oxidizable substance:

Gasoline—0.1 to 5 lbs. of alkoxy phenol antioxidant present per 5,000 gallons of gasoline (approximately .0003-0.15 wt. percent) and 0.1 to 8 lbs. of the mercapto alkanoic acid (approximately .0003-0.24 wt. percent), but preferably one to two lbs.

Lubricating oils—0.02 to 10% and preferably 1 to 2% of each component by weight.

Rubbers and plastics—0.1 to 5% by weight of each component.

The anti-oxidant mixtures of this invention are possessed of many advantages, among which are freedom from objectionable odors and colors in the final compositions. The blend of the two ingredients permits in many cases of the use of a smaller total amount of anti-oxidant than if the alkoxy phenol anti-oxidant were employed alone. In addition, the mercapto alkanoic acids are cheaper than the alkoxy phenols, which makes an equivalent amount of blend less costly than the use of the alkoxy phenol itself.

It is to be understood that the invention is not limited to the specific examples which have been offered merely as illustrations, since other derivatives can be prepared, and that modifications may be made without departing from the spirit of the invention.

What is claimed is:

1. An anti-oxidant composition of matter, consisting essentially of a synergistic combination of a para alkoxy phenol selected from the group consisting of 2-t-butyl-4-methoxy-phenol, 2-2-bis(2-hydroxy-5-methoxy-phenyl) propane, 2,2-bis(2-hydroxy-3-t-butyl-5-methoxyphenyl) propane, styrene alkylated 4-methoxy-phenol, and 2,6 di-t-butyl-4-methoxy phenol, with a low molecular weight unsubstituted mercapto alkanoic acid selected from the group consisting of 2-mercapto ethanoic acid and 3-mercapto propionic acid, the unsubstituted mercapto alkanoic acid and para alkoxy phenol being present in approximately equal amounts.

2. A composition as in claim 1, in which the alkoxy phenol is 2-t-butyl-4-methoxy-phenol, and the mercapto alkanoic acid is 2-mercapto ethanoic acid.

3. A composition of matter as in claim 1, in which the alkoxy phenol is 2,2-bis (2-hydroxy-3-t-butyl-5-methoxyphenyl) propane and the mercapto alkanoic acid is 2-mercapto ethanoic acid.

4. A composition as in claim 1, in which the alkoxy phenol is 2-t-butyl-4-methoxy-phenol, and the mercapto alkanoic acid is 3-mercapto propionic acid.

5. A composition of matter consisting essentially of a hydrocarbon material normally subject to oxidative changes containing a minor proportion effective as an anti-oxidant of a combination of a low molecular weight unsubstituted mercapto alkanoic acid selected from the group consisting of 2-mercapto ethanoic acid and 3-mercapto propionic acid, and a para alkoxy phenol selected from the group consisting of 2-t-butyl-4-methoxy-phenol, 2-2-bis(2-hydroxy-5-methoxy-phenyl) propane, 2,2-bis(2-hydroxy-3-t-butyl-5-methoxyphenyl) propane, styrene alkylated 4-methoxy-phenol, and 2,6 di-t-butyl-4-methoxy phenol, the alkoxy phenol and mercapto alkanoic acid each being present in an amount of from 0.0003 to 5 weight per cent, each also being present in approximately equal amounts, based on the hydrocarbon material normally subject to oxidative changes.

6. A composition of matter as in claim 5, in which the alkoxy phenol is 2,2-bis (2-hydroxy-3-t-butyl-5-methoxyphenyl) propane, and the mercapto alkanoic acid is 2-mercapto ethanoic acid.

7. A composition of matter as in claim 6, in which the hydrocarbon material is a cracked gasoline.

8. A composition of matter as in claim 5 in which the hydrocarbon is a polymerized hydrocarbon.

9. A cracked gasoline containing as inhibitors against oxidative deterioration a combination of 2,2-bis (2-hydroxy-3-t-butyl-5-methoxyphenyl) propane with 2-mercapto ethanoic acid, the 2,2-bis (2-hydroxy-3-t-butyl-5-methoxyphenyl) propane and the 2-mercapto ethanoic acid each being present in an amount corresponding to approximately 2 lbs. per 5,000 gallons of gasoline.

DAVID W. YOUNG.

References Cited in the file of this patent

UNITED STATES PATENTS

| Number | Name | Date |
|---|---|---|
| 1,999,830 | Calcott et al. | Apr. 30, 1935 |
| 2,133,297 | Jones | Oct. 18, 1938 |
| 2,310,710 | Rosenwald et al. | Feb. 9, 1943 |
| 2,397,960 | Gribbins et al. | Apr. 9, 1946 |
| 2,564,106 | Gribbins | Aug. 14, 1951 |